(12) United States Patent
Boos

(10) Patent No.: US 9,061,780 B2
(45) Date of Patent: Jun. 23, 2015

(54) PACKAGING METHOD, PACKAGING DEVICE AND INJECTION MOULDING SYSTEM

(75) Inventor: Christian Boos, Gundelfingen (DE)

(73) Assignee: Waldorf Technik GmbH & Co. KG, Engen (DE)

(*) Notice: Subject to any disclaimer, the term of this patent is extended or adjusted under 35 U.S.C. 154(b) by 714 days.

(21) Appl. No.: 13/262,401

(22) PCT Filed: Jun. 18, 2010

(86) PCT No.: PCT/EP2010/003680
§ 371 (c)(1),
(2), (4) Date: Sep. 30, 2011

(87) PCT Pub. No.: WO2011/003507
PCT Pub. Date: Jan. 13, 2011

(65) Prior Publication Data
US 2012/0124945 A1 May 24, 2012

(30) Foreign Application Priority Data

Jul. 7, 2009 (DE) .......................... 10 2009 032 191

(51) Int. Cl.
*B65B 35/30* (2006.01)
*B65B 19/34* (2006.01)
(Continued)

(52) U.S. Cl.
CPC ................. *B65B 35/30* (2013.01); *B65B 19/34* (2013.01); *B65B 5/08* (2013.01); *B65B 5/068* (2013.01); *B65B 5/105* (2013.01); *B01L 9/54* (2013.01)

(58) Field of Classification Search
CPC ............ B65B 5/06; B65B 5/08; B65B 5/103; B65B 5/105; B65B 5/068; B65B 5/10; B65B 35/30; B65B 19/34

USPC ........... 53/443, 448, 473, 152, 153, 543, 544, 53/237, 444, 148, 495
See application file for complete search history.

(56) References Cited

U.S. PATENT DOCUMENTS 4,130,978 A * 12/1978 Cohen .............................. 53/444
4,254,065 A * 3/1981 Ratkowski ..................... 264/2.5
(Continued)

FOREIGN PATENT DOCUMENTS

DE      93078765        7/1993
DE      100 47 437      4/2002
(Continued)

*Primary Examiner* — Stephen F Gerrity
*Assistant Examiner* — Joy N Sanders
(74) *Attorney, Agent, or Firm* — Bachman & LaPointe, PC

(57) ABSTRACT

The invention relates to a packaging method for packing plastic injection moulded parts (9), including:
simultaneously removing K parts (9) from K cavities (3), and
depositing the parts (9) in an intermediate storage (5) and loading V packaging units (8), each having A parts (9), from the intermediate storage (5).
A plurality of depositing positions (6) arranged next to each other in a deposition plane (7) is used as intermediate storage (5), and the K parts (9) are deposited equally divided among U subgroups (11) in the intermediate storage (5), and K parts (9) are removed from the K cavities (3) and are divided evenly among the U subgroups (11) until each subgroup (11) has L parts (9), wherein the quantity L of the parts (9) of a subgroup (11) corresponds to the quantity A of parts (9) to be loaded into a packaging unit (8), or an integral divisor of A. The invention further relates to a packaging device and to an injection moulding machine having such a packaging device.

20 Claims, 3 Drawing Sheets

(51) Int. Cl.
   *B65B 5/08* (2006.01)
   *B65B 5/06* (2006.01)
   *B65B 5/10* (2006.01)
   *B01L 9/00* (2006.01)

(56) References Cited

U.S. PATENT DOCUMENTS 5,335,481 A * 8/1994 Ward ............................... 53/446
5,799,468 A * 9/1998 Eck et al. ....................... 53/453
5,855,104 A   1/1999 Schlagel et al.
6,451,263 B1 * 9/2002 Sarrine ....................... 73/863.32
7,060,226 B1 * 6/2006 Jessop et al. .................. 422/526
7,451,584 B2 * 11/2008 Schateikis et al. .............. 53/443
2005/0208676 A1 * 9/2005 Kahatt ........................... 436/180
2007/0271882 A1   11/2007 Litke et al.

FOREIGN PATENT DOCUMENTS

| | | |
|---|---|---|
| DE | 102005031695 A1 | 1/2007 |
| EP | 1854723 A2 | 11/2007 |
| WO | 99/55514 | 11/1999 |

* cited by examiner

PACKAGING METHOD, PACKAGING DEVICE AND INJECTION MOULDING SYSTEM

FIELD OF THE INVENTION

The invention relates to a packaging method for packaging plastic injection moulded parts produced in the form of pipette tips or medical reaction vessels, including the following steps:
- extracting K plastic injection moulded parts from K cavities simultaneously, and
- depositing the plastic injection moulded parts in an intermediate storage, and
- loading each of V packaging unit(s) with A injection moulded parts from the intermediate storage, wherein V may be any integer (for example 1, 2, 3, 4 and so on).

The invention further relates to a packaging device for packaging plastic injection moulded parts produced in the form of pipette tips or medical reaction vessels, including:
- extraction means designed for extracting K plastic injection moulded parts from K cavities simultaneously and depositing the plastic injection moulded parts in an intermediate storage, and
- an intermediate storage, and
- loading means designed for loading V packaging units with A injection moulded parts from the intermediate storage, and
- control means designed for actuating the extraction means and/or loading means.

The invention further relates to an injection moulding system with a packaging device of such kind.

BACKGROUND OF THE INVENTION

In known packaging methods for packaging plastic injection moulded parts in the form of pipette tips or medical reaction vessels, particularly for blood analysis, K plastic injection moulded parts are extracted simultaneously from K cavities of an injection moulding system and normally stored temporarily in loose form. Then, each of V packaging units is loaded with A plastic injection moulded parts from this temporary storage arrangement. The drawback in the known method is that it is not possible to allocate the packaged plastic injection moulded parts to specific cavities. This means that it is no longer possible to determine the cavity or cavities from which the plastic injection moulded parts in a given packaging unit originate. Accordingly, if even one plastic injection moulded part in a packaging unit is found to be defective, the entire production batch must be recalled, not just the packaging units that have received plastic injection moulded parts from a given cavity or cavities.

A packaging method offering an improved solution with regard to the problem described above provides for transferring the plastic injection moulded parts produced in the form of pipette tips or medical reaction vessels directly to the packaging units from the cavities without depositing them in a temporary storage arrangement, that is to say without the use of any temporary storage arrangement. The drawback in this arrangement is that the number A of plastic injection moulded parts to be conveyed to a packaging unit must be equal to the number K of cavities, or the number A of plastic injection moulded parts to be transferred in a packaging unit must be equal to an integral multiple of the number K of cavities. Thus for example, with the known packaging method it is not possible in practice to load packaging units with A=105 plastic injection moulded parts from a fixed number K=32 for the cavities. This would only be possible if each of 32 packaging units were loaded simultaneously with one plastic injection moulded part 105 times in each injection moulding shot. However, this is usually impracticable due to the enormous space required for loading 32 packaging units at the same time.

SUMMARY OF THE INVENTION

The invention is therefore based on the underlying idea of suggesting an optimised packaging method for pipette tips or medical reaction vessels which makes it possible not only to track the cavity or cavities from which the plastic injection moulded parts in a packaging unit originate but also to freely select the number A of plastic injection moulded parts in a packaging unit regardless of the fixed number K of cavities in an injection moulding tool. Regardless of the number A of plastic injection moulded parts to be accommodated in a packaging unit, it should preferably not be necessary for the number V of packaging units to be the same as the number K of cavities in the injection moulding tool. The object further consists in suggesting a correspondingly optimised packaging unit for performing such a method. The object further consists in suggesting an injection moulding system with a correspondingly optimised packaging device.

With regard to the packaging method, the packaging device, and the injection moulding system, the objects are solved by the features disclosed herein.

Advantageous refinements of the invention are also described. All combinations of two or more features disclosed in the description, the claims and/or the drawing also fall within the scope of the invention. In order to avoid repetitions, features that are disclosed with regard to the device are also deemed to be disclosed and claimable with regard to the method. In the same way, features that are disclosed with regard to the method are also deemed to be disclosed and claimable with regard to the device.

The invention is based on the underlying idea of depositing the K plastic injection moulded parts from the K cavities in an intermediate storage in organised subgroups, that is to say distributing them equally among U subgroups. In this arrangement, it is possible for only one plastic injection moulded part per subgroup to be deposited, or for several injection moulded parts, but always the same number, to be deposited per subgroup for each injection moulding shot, that is to say for each extraction cycle. In any case, several extraction cycles are required in order to complete the subgroups. The extraction of K plastic injection moulded parts and depositing thereof in the subgroups takes place multiple times and is repeated until a number L of plastic injection moulded parts is present in each subgroup, the number L of plastic parts in a subgroup being equal to the number A of plastic injection moulded parts to be located in one of the packaging units or to an integral divisor of A. With a method performed in accordance with the concept of the invention, it is possible for the first time to fill packaging units with any number A of plastic injection moulded parts in the form of pipette tips or medical reaction vessels without a remainder regardless of the fixed number K of cavities in the injection moulding tool. For example, with an injection moulding system having 32 cavities packaging units may be filled with 105 plastic injection moulded parts without the need to fill 32 packaging units at the same time. This may be carried out for example by creating a total of 32 subgroups, each of 105 plastic injection moulded parts, in the intermediate storage in 105 extraction cycles and, when the 32 subgroups are completed, by filling for example packaging units 1, 2, 4, 8, 16 or 32 with 105 plastic injection moulded parts each at the same time. It is also possible to create 32 subgroups of 21 plastic injection moulded parts each, in which case 5 subgroups may be combined to fill one packaging unit. Traceability of the production path is assured in that for each packaging unit a definite statement may be made regarding which 5 cavities the plastic injection moulded parts originate from. Similarly, it is possible to create 32 subgroups, each with 7 plastic injection moulded parts, and combining 15 subgroups to fill each packaging unit. Equally, 32 subgroups may be created, each consisting of 3 plastic injection moulded parts, and 35 of these subgroups may be combined to fill one packaging unit. The number V of packaging units to be loaded simultaneously is preferably not the same as the number K of cavities. It is particularly preferable if the number V of packaging units to be loaded simultaneously is the same as an integral divisor of A. Thus it is also possible to fill just one packaging unit from the intermediate storage at a time or multiple packaging units as the same time. In other words, number V may have a value of 1.

For example, if 96 plastic injection moulded parts per packaging unit are to be produced with 32 cavities, a method organised according to the concept of the invention offers a wide range of options. For example, 32 subgroups may be formed in the intermediate storage, each including 96 plastic injection moulded parts. But it is also possible, and preferable, to create 16 subgroups of 96 plastic parts each, wherein two plastic injection moulded parts are added to each of the 16 subgroups for each extraction cycle. It is also possible, for example, to create 16 subgroups including 16 plastic injection moulded parts each, and to combine four of the subgroups in each packaging unit, wherein preferably only one packaging unit or only two packaging units or only four packaging units may be loaded at a time, that is to say a smaller number of packaging units than cavities are present. At all events, it is not necessary to load 32 packaging units simultaneously with 96 plastic injection moulded parts each in 96 extraction cycles without temporary storage.

Even if 32 subgroups with 96 plastic injection moulded parts are created simultaneously in the intermediate storage, the space requirement for a correspondingly sized packaging unit is huge compared to the known packaging devices, since even if the grid sizes in the intermediate storage and the packaging units are identical, it is preferable if a larger number of plastic injection moulded parts can be deposited in the intermediate storage per unit of area, since areas of the packaging units that are not used to accommodate plastic injection moulded parts, and are mostly located on the outer borders, do not need to be represented on the intermediate storage.

The method set up according to the concept of the invention is ideally used when the number of plastic injection moulded parts to be provided per packaging unit is not equal to the number of cavities or to a whole-number multiple of the number of cavities.

Additionally, the essential basis of the invention consists in that the subgroups are arranged in a common deposition plane, that is to say preferably side-by-side and not one on top of the other on a panel-like intermediate storage, so that it is relatively easy to set up a packaging device designed to perform the packaging method.

In a refinement of the invention, it is advantageously provided that the K plastic injection moulded parts are combined in subgroups in such manner that number U of subgroups in the intermediate storage is the same as the number V of packaging units or a whole-number multiple of V, so that the entire intermediate storage may be emptied in each packaging cycle. However, this is not an essential prerequisite for realising the previously described, significant advantages of the method. Accordingly, subgroups may remain on the intermediate storage at the end of each packaging cycle, and these will be packed in a subsequent packaging cycle.

According to one possible configuration variant, the plastic injection moulded parts are deposited on the intermediate storage in such manner that they occupy a smaller area than they do in the packaging unit. In other words, the number of plastic injection moulded parts per unit of area is larger in the intermediate storage, preferably at least twice as large and particularly at least three times as large as in a packaging unit. Alternatively, it is also possible, and preferred, that the grid size of the plastic injection moulded parts on the intermediate storage matches the grid size in the packaging units exactly. The area requirement in the intermediate storage may still be smaller, since, as was explained previously, certain areas of packaging unit that are used do not have to be represented on the intermediate storage.

It is particularly advantageous if the plastic injection moulded parts from a given cavity are always allocated to a given subgroup, to simplify tracking of the production path as far as possible. In the event that a subgroup is filled from more than one cavity, it is advantageous if this relationship is kept consistent, so that it is at least possible to make a statement regarding which cavities the plastic injection moulded parts in a packaging unit originate from, so that if a defect is detected, the search for its cause can be limited and only certain packaging units with corresponding identification need to be recalled.

It is particularly advantageous if each subgroup is increased by a consistent number of plastic parts, preferably just one plastic part, after each extraction cycle, in which case a further embodiment may be realised in which the number of plastic injection moulded parts to be transferred to a subgroup may vary from one extraction cycle to the next.

It is particularly advantageous if the subgroups are mapped and deposited on the intermediate storage as a contiguous unit, so that the plastic injection moulded parts in the same subgroup are arranged in a permanent position relative to each other. It is especially preferable if the subgroups are identifiable on the intermediate storage, which may be possible if the subgroups are arranged at distance from each other, though this is not essential.

It is only essential that a control unit is able to detect the positions of the plastic injection moulded parts belonging to a given subgroup. Consequently, it is generally possible to arrange multiple plastic injection moulded parts from various subgroups directly adjacent to each other. It is particularly advantageous if the method is configured such that the relative positions of the plastic injection moulded parts, that is to say the distance between the plastic injection moulded parts in the extraction cycle is not changed, so that plastic injection moulded parts are the same distance apart on the intermediate storage as in the cavities. Of course it is also conceivable, but technically more demanding, to shift the plastic injection moulded parts relative to each other during the extraction process, thereby saving even more space when depositing in the intermediate storage.

The intermediate storage particularly preferably has the form of a panel with a plurality of deposit positions, the deposit positions preferably having the form of depressions or protrusions.

As has been indicated several times in the preceding it is possible for each packaging unit to be supplied with just one or alternatively with multiple subgroups.

The invention is also directed to a packaging device that is preferably designed to perform a packaging method as described in the preceding. The packaging device includes extraction means for the simultaneous extraction of K plastic injection moulded parts from K cavities and for depositing these plastic injection moulded parts in an intermediate storage. The packaging device further includes an intermediate storage and loading means for loading at least one packaging unit with A plastic injection moulded parts from the intermediate storage. The packaging device further includes control means that are designed to actuate the extraction means and/or the loading means. An essential feature is that a flat intermediate storage with a plurality of deposit positions arranged side-by-side in a deposition plane is used, so that multiple subgroups may be created adjacent to each other on the intermediate storage. It is particularly preferable if the deposition plane is disposed horizontally.

The control means are designed in such manner that they are able to actuate the extraction means and/or loading means so that the packaging device is able to perform the packaging method described in the foregoing. In other words, the extraction means are actuated in such manner that K plastic injection moulded parts are deposited in the intermediate storage repeatedly and distributed equally among U subgroups, and that a number of extraction cycles is repeated until L plastic injection moulded parts is present in each subgroup, number L of the plastic injection moulded parts in each subgroup being equal to the number A of plastic injection moulded parts to be loaded in a packaging unit or a whole-number divisor of A. With a packaging device designed according to the concept of the invention, any number of A plastic injection moulded parts may be provided per packaging unit, regardless of the fixed number of cavities K, without the need to match number of cavities K to number A of plastic injection moulded parts per packaging unit or a whole-number divisor of A. With regard to advantageous configurations of the device, reference is made to the preceding, detailed description of the packaging method, wherein the control means, the extraction means and the loading means are designed so as to be actuatable in such manner that the device reflects the refinements of the packaging method described in detail previously.

It is particularly advantageous if the packaging device includes an intermediate storage in the form of a flat panel, in which the deposit positions are realised as depressions or protrusions (attachment elements), wherein the distance between adjacent depressions or attachment elements is the same as the distance between plastic injection moulded parts that are transferred into a packaging unit, that is to say the grid size on the intermediate storage is the same as the grid size in the packaging units.

The invention is also directed to an injection moulding system with an injection moulding device having K cavities for the simultaneous production of K plastic injection moulded parts, the injection moulding system being designed for producing plastic injection moulded parts having the form of pipette tips or medical reaction vessels. The injection moulded system includes at least one, preferably only one packaging device constructed as described in the preceding.

BRIEF DESCRIPTION OF THE DRAWINGS

Other advantages, features and details of the invention will be evident from the following description of preferred embodiments and with reference to the drawing. In the drawing.

DETAILED DESCRIPTION

In the figures, identical elements and elements having the same function are the same elements are identified with the same reference figures.

Figure 1:
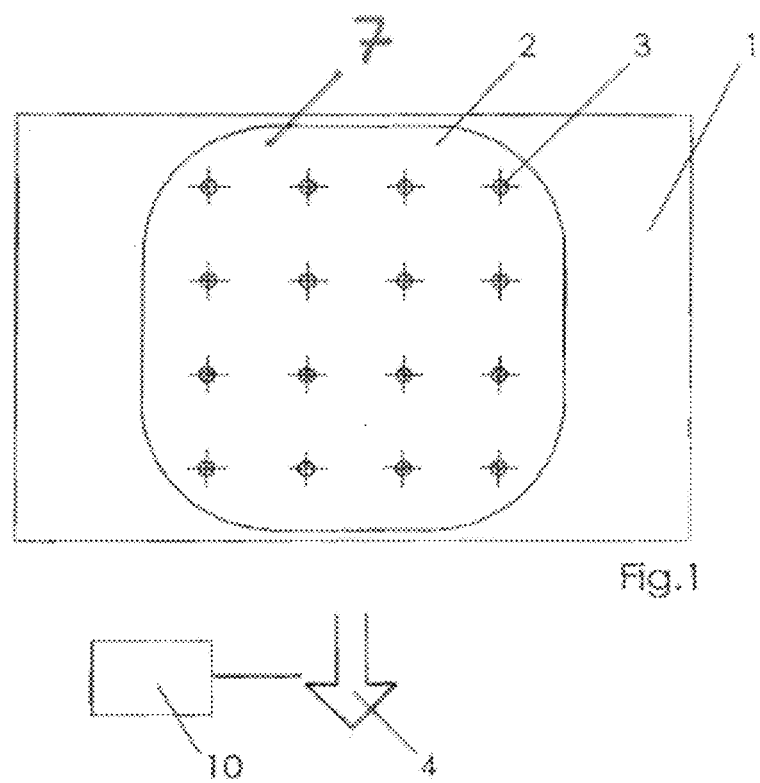
FIG. 1 shows an injection moulding device having an injection mould which in the embodiment shown has a fixed number K=16 cavities for the simultaneous production of K plastic injection moulded parts in the form of pipette tips or medical reaction vessels.

FIG. 1 shows an injection moulding device 1, including an injection moulding tool 2 with K=16 cavities 3 for the simultaneous production of 16 plastic injection moulded parts in the form of pipette tips or medical reaction vessels, as part of an injection moulding system. Injection moulding device 1 is equipped for example with extraction means 4 in the form of a vacuum gripper, preferably having a number of suction elements corresponding to the number of cavities, and which are represented only schematically by an arrow, wherein the extraction means are part of a packaging device that is not associated with a reference number. Extraction means 4 serve to extract the plastic injection moulded parts from cavities 3 and transfer the plastic injection moulded parts to an intermediate storage 5 shown in FIG. 2a. Intermediate storage 5 is furnished with a plurality of deposit positions 6 conformed as recesses, deposit positions 6 being arranged in a common deposition plane 7, which in this case is horizontal.

Figure 4:
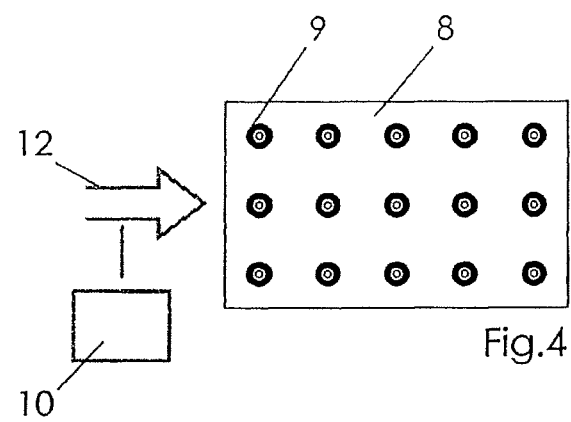
FIG. 4 shows a packaging unit with, in the embodiment shown, a number A=15 plastic injection moulded parts.
Figure 5:
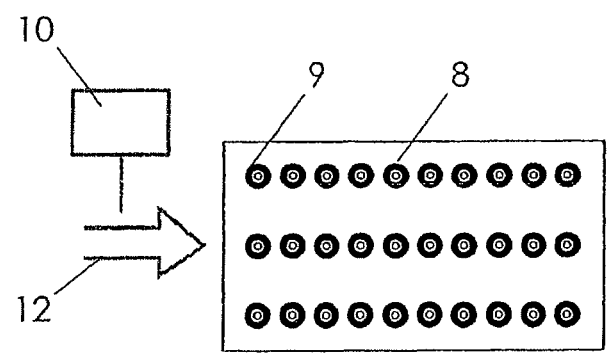
FIG. 5 shows an alternative packaging unit A=30 plastic injection moulded parts.

The object is to use existing injection moulding device 1, equipped with an injection moulding tool 2 with K=16 cavities 3 to fill a packaging unit 8 shown in FIG. 4 with A=15 plastic injection moulded parts 9, or alternatively packaging unit 8 shown in FIG. 5 with A=30 plastic injection moulded parts 9.

Figure 2A:
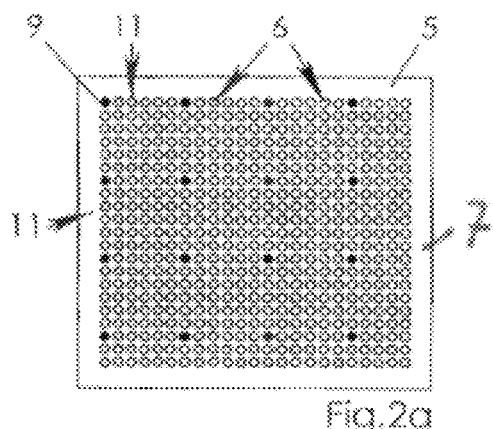
FIG. 2a to FIG. 2e show an intermediate storage after a different number of extraction cycles in each case, wherein in the embodiment shown subgroups are created on the intermediate storage and these are expanded by one plastic injection moulded part for each extraction cycle, that is to say after each injection moulding shot.
Figure 2B:
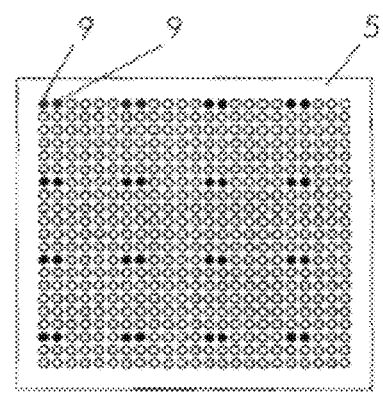
Figure 2C:
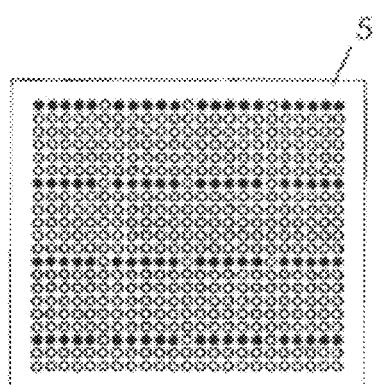
Figure 2D:
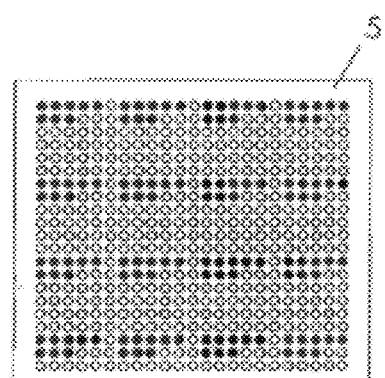
Figure 2E:
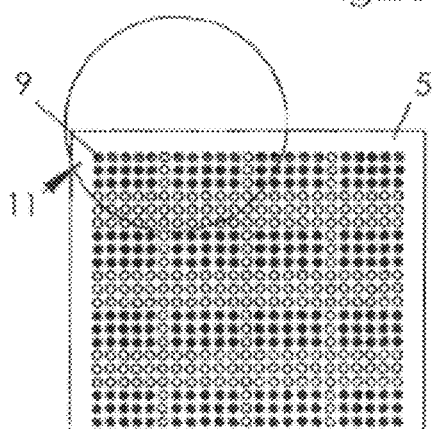

For this purpose, control means 10 in the form of a controller and indicated schematically in FIG. 1 actuate extraction means 4 such that a total of 16 subgroups 11 are formed on intermediate storage 5 in deposition plane 7, and in the embodiment shown each subgroup 11 is increased by one plastic injection moulded part 9 in every extraction cycle, that is to say after each injection moulding shot. The extraction cycle (including unloading onto the intermediate storage) is repeated 15 times in all, until the state shown in FIG. 2e is reached, in which each subgroup 11 includes a total of 15 plastic injection moulded parts 9, which are arranged in three rows and five columns in each subgroup. It is noteworthy that if one compares FIG. 1 with FIG. 2a the relative positions of cavities 3 correspond to the relative positions of plastic injection moulded parts 9 that are deposited on intermediate storage 5 during an extraction cycle. After each extraction cycle, one plastic injection moulded part 9 is deposited on intermediate storage 5 in a deposit position offset from the previous deposit position in each subgroup 11, as may be seen by comparing the figures in the series FIG. 2a to FIG. 2e, wherein FIG. 2a shows intermediate storage 5 after a first extraction cycle, FIG. 2b shows intermediate storage 5 after a second extraction cycle, FIG. 2c shows intermediate storage 5 after a fifth extraction cycle, FIG. 2d shows intermediate storage 5 after an eighth extraction cycle, and FIG. 2e shows intermediate storage 5 after fifteen extraction cycles.

Figure 3:
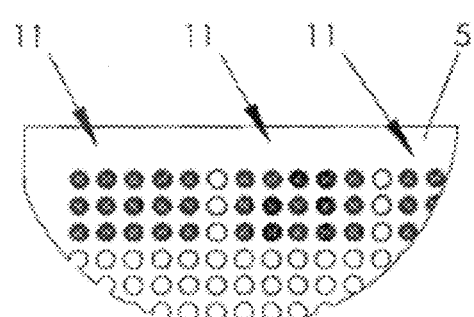
FIG. 3 shows an enlarged detail from FIG. 2e.

FIG. 3 shows an enlarged representation of a part of the completely filled subgroups 11 on intermediate storage 5. In all U=16 subgroups have been completed.

After subgroups 11 have been completed on intermediate storage 5, packaging units 8 may be loaded. For example, if packaging units 8, represented for exemplary purposes by one packaging unit 8 in FIG. 4, are each to be loaded with A=15 plastic injection moulded parts 9, one packaging unit 8 each may be loaded for example with one subgroup 11 of plastic injection moulded parts 9 one after the other from intermediate storage 5. Alternatively, for example two, four or eight (or if desired even sixteen) packaging units 8 may be loaded with one subgroup each at the same time, in which case each subgroup 11 includes plastic injection moulded parts 9 from a defined, that is to say specified cavity 3, thereby ensuring complete traceability. Loading means 12, for example in the form of vacuum grippers, represented merely by an arrow and actuated directly by control means 10, are provided for loading packaging unit or units 8 from intermediate storage 5. If required, different logic units may be assigned to extraction means 4 and loading means 12—however it is preferable if a common controller is provided for both extraction means 4 and loading means 12.

If, alternatively, the packaging units 8 shown in FIG. 5 are each to be loaded with A=30 plastic injection moulded parts, two of the subgroups 11 from the intermediate storage shown in FIG. 2e must be combined. The packaging unit 8 of FIG. 5 then includes exclusively plastic injection moulded parts 9 from two specified cavities. A single packaging unit, two, four or eight packaging units may be loaded at the same time with plastic injection moulded parts 9 or with two subgroups 11 from intermediate storage 5. For this, loading means 12 simply need to be configured correspondingly or have a corresponding capacity.

The invention claimed is:

1. A packaging method for packaging plastic injection moulded parts (9) produced in the form of pipette tips or medical reaction vessels, including the steps of:
    extracting a number K of plastic injection moulded parts (9) from the number K cavities (3) simultaneously, and
    depositing the plastic injection moulded parts (9) in an intermediate storage (5), and
    loading each of a number V of packaging unit(s) (8) with a number A of injection moulded parts (9) from the intermediate storage (5), wherein
    the intermediate storage (5) has a plurality of deposit positions (6) arranged side by side in a deposition plane (7), and
    the number K of plastic injection moulded parts (9) are distributed equally among a number U of subgroups (11) in the intermediate storage (5), and
    the number K of plastic injection moulded parts (9) are extracted from the number K of cavities (3) repeatedly and distributed equally among the number U of subgroups (11) until each subgroup (11) has the number L of plastic injection moulded parts (9),
        wherein the number L of plastic injection moulded parts (9) in a subgroup (11) is the same as the number A of plastic injection moulded parts (9) to be loaded in a packaging unit (8) or a whole-number divisor of A, and
        wherein each subgroup (11) is always extended by the same number plastic injection moulded parts (9), in each extraction cycle.

2. The method as recited in claim 1, wherein
    the number K of plastic injection moulded parts (9) are deposited in the intermediate storage (5) in such manner that the number U of subgroups (11) is equal to or not equal to the number V of packaging units (8) or a whole-number multiple of V.

3. The method as recited in claim 1, wherein
    more plastic injection moulded parts (9) per unit area are deposited in the intermediate storage (5) than in the packaging units (8).

4. The method as recited in claim 1, wherein
    the plastic injection moulded parts (9) from a given cavity (3) or cavities (3) are always deposited in a given subgroup (11) or subgroups (11).

5. The method as recited in claim 1, wherein
    the number U of subgroups (11) are deposited as separate units next to each other with a lateral separation from each other.

6. The method as recited in claim 1, wherein
    the number K of plastic injection moulded parts (9) extracted from the number K of cavities (3) in each extraction cycle are deposited in the intermediate storage (5) in the same positions relative to each other.

7. The method as recited in claim 1, wherein
    a panel with a number of recesses or attachment elements corresponding to the number of deposition positions (6) is used as the intermediate storage (5).

8. The method as recited in claim 1, wherein
    the V packaging units (8) are each loaded with either a single subgroup (11) or with multiple subgroups (11).

9. The method as recited in claim 1, wherein each subgroup is extended by a single plastic injection moulded part (9).

10. A packaging device for packaging plastic injection moulded parts (9) produced in the form of pipette tips or medical reaction vessels, including:
    extraction means (4) designed for extracting a number K of plastic injection moulded parts (9) from a number K of cavities (3) simultaneously and depositing the plastic injection moulded parts (9) in an intermediate storage (5), and
    loading means (12) designed for loading a number V of packaging units (8) with a number A of injection moulded parts (9) from the intermediate storage (5), and
    control means (10) designed for actuating the extraction means (4) and/or loading means (12),
    the intermediate storage (5) has a plurality of deposit positions (6) arranged side by side in a deposition plane (7), and
    the control means (10) are configured to actuate the extraction means (4) and/or the loading means (12) in such manner that
        the number K of plastic injection moulded parts (9) are distributed equally among a number U of subgroups (11) in the intermediate storage (5), and such that
        the number K of plastic injection moulded parts (9) are extracted from the number K of cavities (3) repeatedly and distributed equally among the number U of subgroups (11) until each subgroup (11) has a number L of plastic injection moulded parts (9),
            wherein the number L of plastic injection moulded parts (9) in a subgroup (11) is the same as the number A of plastic injection moulded parts (9) to be loaded in a packaging unit (8) or a whole-number divisor of the number A, and
            wherein each subgroup (11) is always extended by the same number plastic injection moulded parts (9), in each extraction cycle.

11. The device as recited in claim 10, wherein
    the control means (10) are designed to actuate the extraction means (4) in such a way that the number K of plastic injection moulded parts (9) are deposited in the intermediate storage (5) so that the number U of subgroups (11) is equal to or not equal to the number V of packaging units (8) or a whole-number multiple of the number V.

12. The device as recited in claim 10, wherein
the control means (10) are designed to actuate the extraction means (4) in such a way that the plastic injection moulded parts (9) from a specified cavity (3) or cavities (3) are always deposited in a specified subgroup (11) or subgroups (11).

13. The device as recited in claim 10, wherein
the intermediate storage (5) is constructed in such manner that it is capable of accommodating more plastic injection moulded parts (9) per unit of area than the packaging units (8), or that the grid size for the plastic injection moulded parts (9) of the intermediate storage (5) is equal to the grid size for the plastic injection moulded parts (9) in the packaging units (8).

14. The device as recited in claim 10, wherein
the control means (10) are designed to actuate the extraction means (4) in such a way that each subgroup (11) grows by the same number of plastic injection moulded parts (9) after each extraction cycle.

15. The device as recited in claim 14, wherein the control means (10) are designed to actuate the extraction means (4) in such a way that each subgroup (11) grows by a single plastic injection moulded part (9) after each extraction cycle.

16. The device as recited in claim 10, wherein
the control means (10) are designed to actuate the extraction means (4) in such a way that the number U of subgroups (11) are deposited side by side with each other, with a lateral separation from each other, as separate units.

17. The device as recited in claim 10, wherein
the control means (10) are designed to actuate the extraction means (4) in such a way that the number K of plastic injection moulded parts (9) extracted from the number K of cavities (3) in each extraction cycle are deposited in the same positions relative to each other in the intermediate storage (5).

18. The device as recited in claim 10, wherein
the intermediate storage (5) is constructed as a panel with a number of recesses or attachment points corresponding to the number of deposit positions (6).

19. The device as recited in claim 10, wherein
the control means (10) are designed to actuate the loading means (12) in such a way that the V packaging units (8) are each loaded with a single subgroup (11) or each with multiple subgroups (11).

20. An injection moulding system comprising an injection moulding device (1) having the number K of cavities (3) for simultaneous production of the number K of plastic injection moulded parts (9) in the form of pipette tips or medical reaction vessels, and a packaging device according to claim 10.

* * * * *